Dec. 15, 1970  D. A. ESPEN  3,548,284
SYNCHRO DATA TRANSMISSION APPARATUS HAVING DISCRETE GAIN
CHANGING TO COMPENSATE FOR UNDESIRABLE SIGNAL
GRADIENT VARIATIONS
Filed July 19, 1968  3 Sheets-Sheet 1

INVENTOR.
DAVID A. ESPEN
BY
H P Terry
ATTORNEY

United States Patent Office 3,548,284
Patented Dec. 15, 1970

3,548,284
SYNCHRO DATA TRANSMISSION APPARATUS HAVING DISCRETE GAIN CHANGING TO COMPENSATE FOR UNDESIRABLE SIGNAL GRADIENT VARIATIONS
David A. Espen, Phoenix, Ariz., assignor to Sperry Rand Corporation, a corporation of Delaware
Filed July 19, 1968, Ser. No. 746,174
Int. Cl. G05b 11/06
U.S. Cl. 318—691                                   7 Claims

ABSTRACT OF THE DISCLOSURE

A synchro data transmission system having discrete gain changing to compensate for undesirable signal gradient variations that is particularly suitable for application in magentic compass systems to compensate for the change in the field strength of the horizontal component of the earth's magnetic field.

BACKGROUND OF THE INVENTION

Field of the invention

The invention pertains to compensation for undesirable signal gradient changes in synchro data transmission systems such as magnetic compass systems utilizing flux valves.

Description of the prior art

When utilizing magnetic compass systems, difficulty is experienced when flying at high latitudes due to the decreasing strength of the horizontal component of the earth's magnetic field because the flux valve which provides the input signal to the magnetic compass system has an output which is proportional to the horizontal component of the earth's magnetic field. At high latitudes where the strength of the horizontal component is substantially less than that of the low or intermediate latitude, the compass system experiences decreased sensitivity resulting in a less accurate heading indication.

A prior art method to compensate for the earth's field change is described in U.S. Pat. No. 3,233,332. It utilizes a gain change element which continuously varies with field strength changes. One disadvantage of the prior art system is that the gain versus field strength relation is a function of the particular characteristics of the gain changing device and in practice this characteristic is found to vary greatly among devices of the identical type thereby necessitating individual circuit corrections. Further, devices of this type are very sensitive to temperature which causes variations in the gain versus field strength relation. This requires careful selection and matching of components for each individual circuit. Furthermore, it is very difficult to design simple, continuous gain changing circuits which will have identical operation in multiple channel systems where the gain in each of the channels must be maintained identical to that of the other channels. Another problem arises when gradient compensation is not achieved subsequent to amplification stages. This is particularly critical in applications using integrated circuit amplifiers since the integrated circuits available presently are limited in their capability to accept high supply voltages which are required to avoid amplifier saturation due to the large field strength.

SUMMARY OF THE INVENTION

The present invention utilizes discrete gain changing in a synchro data transmission system, for example, in a magnetic compass system having a plurality of channels, to compensate for undesirable variations in the input signal gradient. The present invention utilizes switching devices in the individual channels between the transmitter and receiver to provide high gain for low gradient inputs and low gain for high gradient inputs thereby avoiding the aforementioned problems of the prior art. There is no attempt made to vary the gain in a continuous manner and the method of changing the gain is such that the gain versus field strength relation does not depend on a loosely controlled and temperature responsive characteristic. Furthermore, the present invention provides for matching the channel characteristics of a plurality of channels in a multiple channel configuration in order that the individual channel gains are identical since otherwise the differences in channel gains would result in the introduction of positional errors. The present invention therefore provides a system which, with respect to magnetic compass application, is useful over a wide range of geographic locations with widely varying earth's field magnetic characteristics that is simple and accurate.

DESCRIPTION OF THE PREFERRED EMBODIMENT

Figure 1:
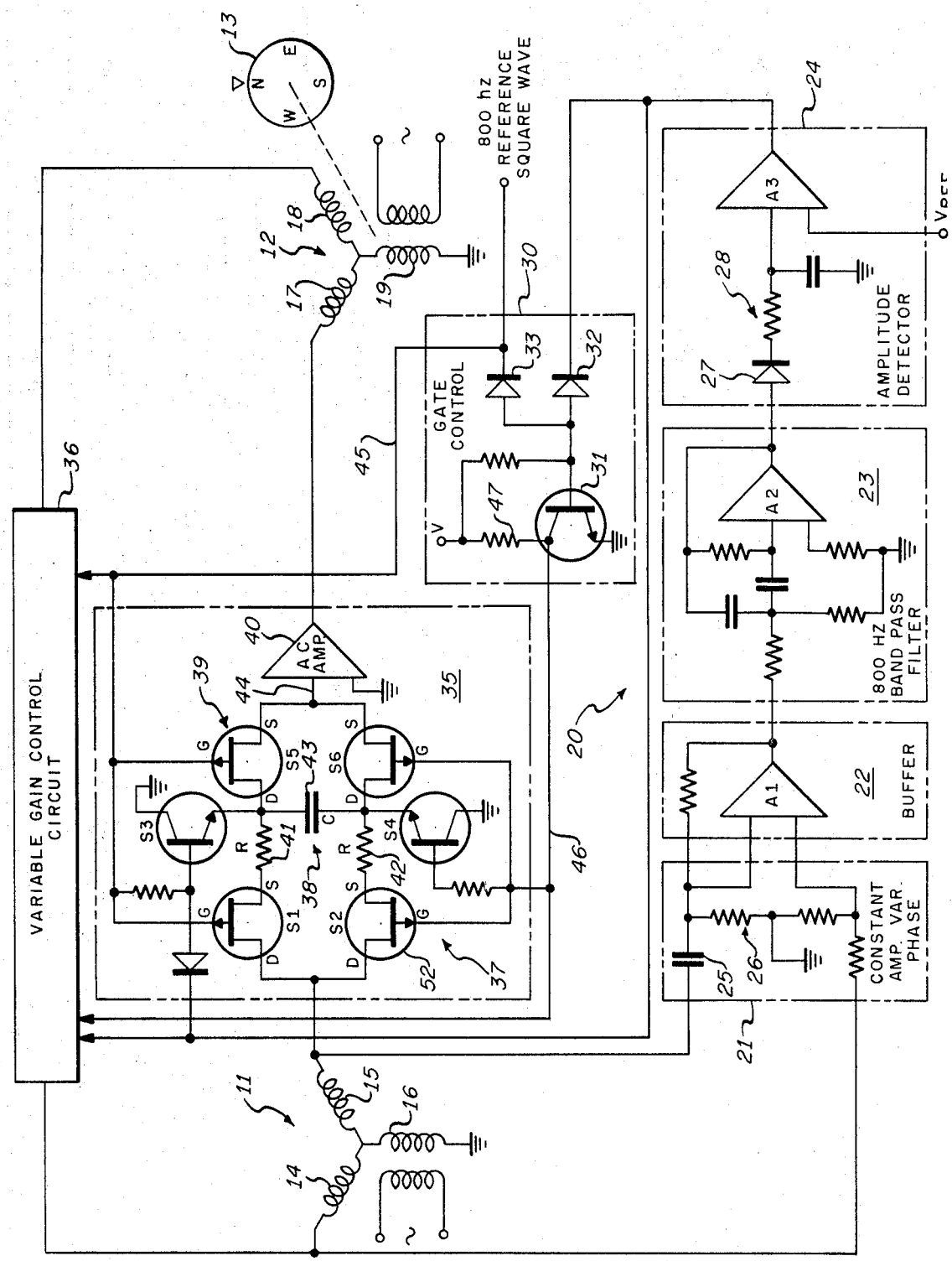
FIG. 1 is a schematic diagram partially in block form of a magnetic compass system incorporating the present invention.

The present invention will be described for purposes of example with respect to a magnetic compass system 10 as shown in FIG. 1. The magnetic compass system 10 includes a flux valve 11 which is responsive to the horizontal component of the earth's magnetic field and provides a signal representative thereof whose average value accurately represents the heading of the aircraft upon which the flux valve is mounted. The strength or magnitude of the horizontal component of the earth's magnetic field is considerably less at higher latitudes than at lower or intermediate latitudes and in the absence of the present invention, the system 10 would experience an undesirable reduction in the signal gradient of the flux valve output voltage which would cause a corresponding drop in the voltage driving the receiver 12 that positions the compass card 13. This would result in a low torque being applied to the receiver 12 with consequent lagging in the synchro follow-up and an erroneous heading indication on the compass card 13.

The flux valve 11 is conventional and has three Y-connected pick-up windings 14, 15 and 16 which are excited by means of an excitation coil in a well known manner. The receiver 12 has three similarly connected corresponding stator windings 17, 18 and 19.

In accordance with the present invention, the flux valve signal gradient is detected by a gradient detector means 20 comprising a constant amplitude variable phase circuit 21, a buffer circuit 22, a bandpass filter circuit 23 and an amplitude detector circuit 24. One extremity of each of the windings 14, 15 and 16 is centrally connected while the other extremities of the windings 14 and 15 are connected to the constant amplitude variable phase circuit 21. The other extremity of the winding 16 is connected to ground potential. The three-wire flux valve signal is connected to a constant amplitude variable phase two-wire signal in the circuit 21 by the capacitor 25 and resistive network 26. It will be noted that only one frequency component of the harmonic rich flux valve signal will have this characteristic at the input to the buffer amplifier circuit 22. This frequency (800 Hz. as shown) is determined by the resistor capacitor product of the constant amplitude-variable phase circuit 21. This signal is amplified in the buffer amplifier 22 and then coupled to the 800 Hz. bandpass filter circuit 23 which attenuates all other frequencies such that its output is a 800 Hz. sine wave of constant amplitude and variable phase. Although the amplitude is constant as a function of the position of the flux valve 11 in the earth's magnetic field, it will vary directly as the field strength of the horizontal component of the earth's magnetic field. The output of the bandpass filter circuit 23 is rectified by a diode 27 and filtered by an RC filter circuit 28 and then compared with a reference $V_{ref}$ in the amplitude detector circuit 24. Depending on whether the reference voltage $V_{ref}$ is above or below the signal proportional to the earth's field strength, the output of the amplitude detector circuit 24 will be high or low, respectively.

The output of the amplitude detector 24 is connected to a gate control circuit 30 having a transistor 31. The base of the transistor 31 is responsive to the output of the amplitude detector 24 and to a 800 Hz. reference square wave via diodes 32 and 33, respectively. If the field strength of the horizontal component of the earth's magnetic field is below a certain value, the amplitude detector output will be high and the transistor 31 will be gated by the 800 Hz. reference square wave. However, if the earth's field strength is above a certain value, the amplitude detector output will be low and the transistor 31 will be clamped in the off state. The collector of the transistor 31 is connected to control a variable gain control circuit 35 connected between the winding 15 of the flux valve 11 and the corresponding winding 17 of the receiver 12 and an identical variable gain control circuit 36 connected between the winding 14 and the corresponding winding 18.

Each of the variable gain control circuits 35 and 36 comprises demodulating, filtering, modulating and amplifying circuitry 37, 38, 39 and 40, respectively. The demodulator circuit 37 is of the synchronous type and comprises switches S1, S2, S3 and S4. The switches S1 and S2 may be field effect transistors while the switches S3 and S4 may be npn transistors. The filter circuit 38 comprises resistors 41 and 42 and a common capacitor 43. The switches S5 and S6 of the modulator circuit 39 may be field effect transistors.

The winding 15 of the flux valve 11 is connected to the drain of the switch S1 which has its source connected to an extremity of the resistor 41. The other extremity of the resistor 41 is connected to one side of the capacitor 43, the emitter of the switch S3 and the drain of the switch S5. The source of the switch S5 is connected to the input terminal 44 of the A.C. amplifier 40 which has its output connected to the winding 17 of the receiver 12. The 800 Hz. reference square wave is connected via a lead 45 to the gate of the switch S1, to the base of the switch S3 and to the gate of the switch S5 and in a similar manner to the identical components in the variable gain control circuit 36.

A mirror image parallel circuit is likewise connected to the winding 15 with the drain of the switch S2 connected to receive the signal from the winding 15. The source of the switch S2 is connected to one extremity of a resistor 42 which has its other extremity connected to the other side of the capacitor 43, to the emitter of the switch S4 and to the drain of the switch S6. The source of the switch S6 is connected to the input terminal 44 of the A.C. amplifier 40. The collectors of the switches S3 and S4 are connected to ground potential. The collector of the transistor 31 is connected via a lead 46 to the gate of the switch S2, the base of the switch S4 and the gate of the switch S6 and in a similar manner to the identical components in the variable gain control circuit 36.

In operation, it will be noted that the demodulator-filter-modulator circuit 37, 38 and 39 will perform the same function if the switches S2, S3 and S6 are left open and the switch S4 is closed. However, the demodulator-filter-modulator circuit under these conditions will have a lower gain than if all the switches are gated. This low gain configuration may be considered a normal mode of operation and is used in the low or intermediate latitudes where the horizontal component of the earth's magnetic field strength may be considered normal or high. If the horizontal component of the earth's magnetic field is above a predetermined value, i.e., it is a normal or high gradient, it is detected by the amplitude detector 24 and a low signal output is provided to the transistor 31 thereby clamping the transistor 31 in an off state. This renders the collector voltage of the transistor 31 high by virtue of its being connected to a voltage source V via a resistor 47. The high collector voltage is applied to the gates of the switches S2 and S6 and to the base of the switch S4 thereby opening the switches S2 and S6 and closing the switch S4. Thus, only half of the demodulator-filter-modulator circuit 37, 38 and 39 will operate and the gain of the channel is low.

Figure 2:
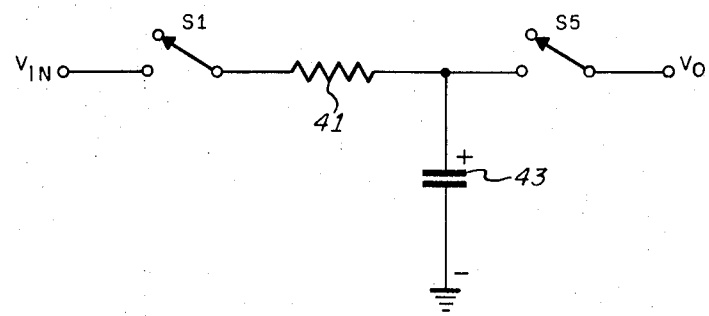
FIG. 2 is an equivalent schematic representation of the demodulator-filter-modulator circuit of FIG. 1 in a low gain configuration.
Figure 3:
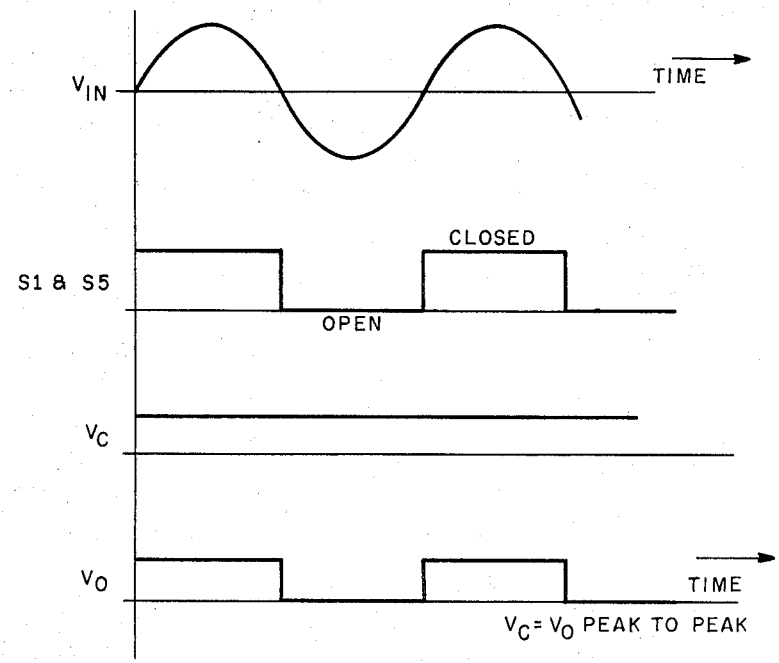
FIG. 3 is a graph of the signals operative with respect to the circuit of FIG. 2 versus time.

The equivalent circuit of the operative portion of the demodulator-filter-modulator circuit 37, 38, 39 in the low gain configuration in the presence of a high field gradient is shown in FIG. 2. The switch S1 operates as a half wave synchronous demodulator being triggered by the 800 Hz. reference square wave. The RC filter comprising now the resistor 41 and capacitor 43 yields a capacitive voltage $V_c$ equal to the average value of the input voltage $V_{in}$ as shown in FIG. 3. The modulator switch S5 chops the capacitor voltage $V_c$ to provide an output voltage $V_o$ having a peak-to-peak output equal to the capacitor voltage $V_c$. The graph of FIG. 3 shows the relative time sequence of the signals with respect to the operation of the circuit of FIG. 2, explained above.

Figure 4:
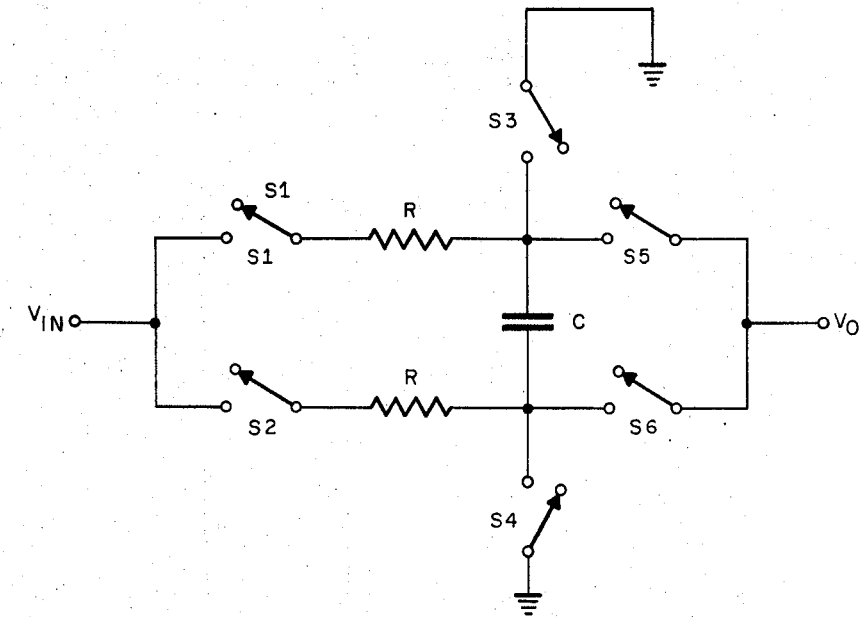
FIG. 4 is an equivalent schematic representation of the demodulator-filter-modulator circuit of FIG. 1 in a high gain configuration.
Figure 5:
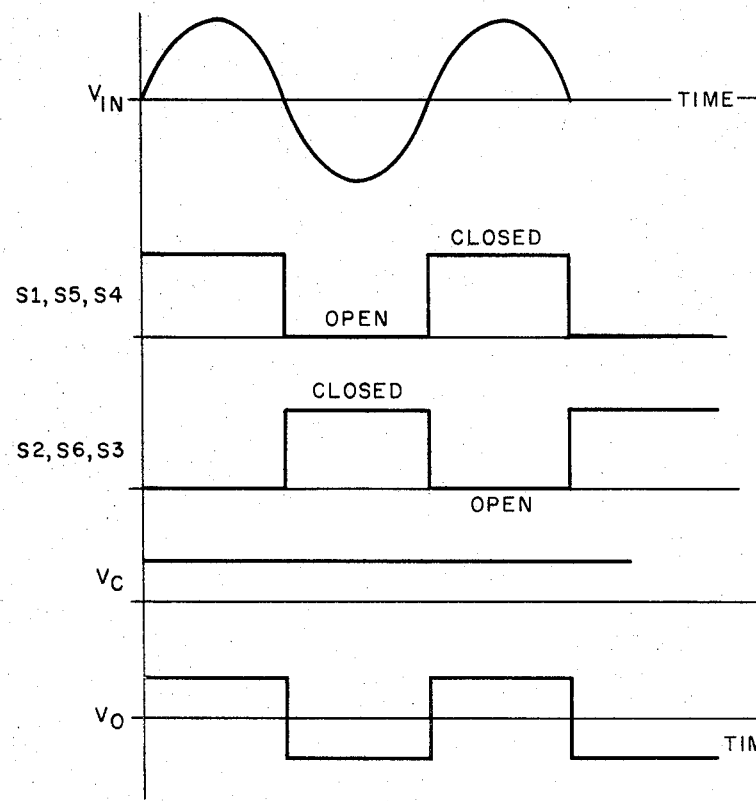
FIG. 5 is a graph of the signals operative with respect to the circuit of FIG. 4 versus time.

If the horizontal component of the earth's magnetic field strength is below the aforementioned predetermined value, the output of the amplitude detector 24 will be high and the transistor 31 will be gated by the 800 Hz. reference square wave. The output of the collector will be phase-inverted by 180° with respect to the 800 Hz. reference square wave to provide sequential gating of the switches S2 and S6 with respect to the switches S1 and S5. The equivalent circuit for the high gain configuration in the presence of a low field gradient is shown in FIG. 4. The gating functions are now applied not only to switches S1 and S5 but also to switches S2, S3, S4 and S6. Now the latter switches are gated and change the demodulator mode from half wave synchronous to full wave synchronous as shown by the operation of the switches in the graph of FIG. 5. The RC filtering function remains basically the same providing a constant capacitor voltage $V_c$. However, the modulation now provides an output voltage $V_o$ that goes positive and negative with a peak-to-peak value of twice the capacitor voltage $V_c$.

The variable gain control circuit 36 is identical in circuitry and operation with respect to circuit 35 thereby providing ease in matching channel characteristics and operating modes. Therefore, two modes of operation are provided, one for high gain and one for low gain, and the channel gain characteristics can be closely matched during both operating modes with consequent minimization of errors.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:
1. In synchro data transmission apparatus having transmitter means connected in multicircuit fashion for providing a plurality of periodically varying signal outputs subject to undesirable signal gradient variations and receiver means connected in similar multicircuit fashion, the improvement comprising variable gain control means connected between said transmitter means and said receiver means, said variable gain control means including demodulating, filtering, modulating and amplifying means adapted to be gated to provide a first output signal under high gradient conditions and a second substantially greater output signal under low gradient conditions to said receiver means, gradient detector means connected to said transmitter means and responsive to said gradient variations for providing a first detector signal in response to said high gradient conditions and a second detector signal in response to said low gradient conditions, and gate control means coupled between said gradient detector means and said variable gain control means for selectively gating said variable gain control means in response to said first and second detector signals whereby said undesirable signal gradient variations are compensated.

2. In apparatus of the character recited in claim 1 in which said demodulating, filtering and modulating means comprises identical first and second parallel paths having substantially identical components in each path and common capacitor means for providing a voltage doubling effect in response to said low gradient conditions.

3. In apparatus of the character recited in claim 2 in which said demodulating means includes a first pair of switches in said first path and a second pair of switches in said second path, said filtering means includes a first resistor in said first path and a second resistor in said second path cooperative with a common capacitor cooperative with said demodulating means, and said modulating means includes a first switch in said first path and a second switch in said second path cooperative with said filtering means for selectively providing said voltage doubling effect.

4. In apparatus of the character recited in claim 1 in which said transmitter means includes a flux valve for providing said plurality of periodically varying signal outputs each dependent in phase sense and magnitude upon the position of said flux valve in the earth's magnetic field wherein the variation in the horizontal component of the earth's magnetic field results in said undesirable signal gradient variations, said receiver means is adapted to provide an indication of magnetic heading, and said gradient detector means is responsive to the variation in said horizontal component of the earth's magnetic field strength.

5. In apparatus of the character recited in claim 4 in which said variable gain control means includes mirror image demodulating, filtering and modulating means for providing voltage doubling to compensate for said undesirable signal gradient variations.

6. In apparatus of the character recited in claim 5 in which said demodulating means includes a first pair of switches in said first path and a second pair of switches in said second path, said filtering means includes a first resistor in said first path and a second resistor in said second path cooperative with a common capacitor cooperative with said demodulating means, and said modulating means includes a first switch in said first path and a second switch in said second path cooperative with said filtering means for selectively providing said voltage doubling effect.

7. In apparatus of the character recited in claim 6 in which said gate control means provides a first gating signal to said first pair of switches and said first switch in response to said first detector signal for providing a low gain configuration and provides a second gating signal to said second pair of switches and said second switch in response to said second detector signal for providing a high gain configuration wherein said voltage doubling effect prevails.

References Cited

UNITED STATES PATENTS

| | | |
|---|---|---|
| 2,924,023 | 2/1960 | Whitehead. |
| 2,959,866 | 11/1960 | Seaman. |
| 2,959,865 | 11/1960 | Boose. |
| 3,491,276 | 1/1970 | Sager et al. |

BENJAMIN DOBECK, Primary Examiner

U.S. Cl. X.R.
318—632, 692